US007793340B2

(12) United States Patent
Kiester et al.

(10) Patent No.: US 7,793,340 B2
(45) Date of Patent: Sep. 7, 2010

(54) CRYPTOGRAPHIC BINDING OF AUTHENTICATION SCHEMES

(75) Inventors: W. Scott Kiester, Orem, UT (US); Cameron Mashayekhi, Salt Lake City, UT (US); Karl E. Ford, Highland, UT (US)

(73) Assignee: Novell, Inc., Provo, UT (US)

( * ) Notice: Subject to any disclaimer, the term of this patent is extended or adjusted under 35 U.S.C. 154(b) by 274 days.

(21) Appl. No.: 11/943,783

(22) Filed: Nov. 21, 2007

(65) Prior Publication Data

US 2009/0132828 A1 May 21, 2009

(51) Int. Cl.
*H04L 9/32* (2006.01)
*G06F 7/04* (2006.01)
*G06F 15/16* (2006.01)
*G06F 12/14* (2006.01)

(52) U.S. Cl. .............................. 726/4; 713/176; 713/155
(58) Field of Classification Search ........................ None
See application file for complete search history.

(56) References Cited

U.S. PATENT DOCUMENTS

| 5,774,551 | A  | * | 6/1998  | Wu et al. ...................... 713/155 |
| 6,792,466 | B1 | * | 9/2004  | Saulpaugh et al. .......... 709/229 |
| 7,254,705 | B2 | * | 8/2007  | Yokota et al. ............... 713/155 |
| 7,269,736 | B2 |   | 9/2007  | Howard et al. |
| 7,610,617 | B2 | * | 10/2009 | Kelly et al. ...................... 726/5 |
| 2002/0138728 | A1 | * | 9/2002  | Parfenov et al. ............. 713/170 |
| 2002/0174306 | A1 |   | 11/2002 | Gajjar et al. |
| 2003/0084288 | A1 | * | 5/2003  | de Jong et al. .............. 713/168 |
| 2004/0049687 | A1 |   | 3/2004  | Orsini et al. |
| 2004/0088260 | A1 | * | 5/2004  | Foster et al. .................. 705/64 |
| 2006/0235796 | A1 | * | 10/2006 | Johnson et al. ............... 705/44 |

OTHER PUBLICATIONS

J.D. Meier, Alex Mackman, Blaine Wastell, Prashant Bansode, Chaitanya Bijwe; "Explained: Forms Authentication in ASP.NET 2.0", Microsoft Corporation, Nov. 2005, Retrieved from http://msdn.microsoft.com/en-us/library/aa480476.aspx on Apr. 22, 2010.*
Novell, Inc., "Novell Announces Novell Modular Authentication Services (NMAS)," www.novell.com/techcenter/articles/dnd20000303.html, Mar. 20, 2001, 6 pps.
Novell, Inc., "Novell Modular Authentication Service (NMAS)," www.novell.com/products/nmas, 5 pps, Nov. 15, 2007.

* cited by examiner

*Primary Examiner*—Matthew T Henning
(74) *Attorney, Agent, or Firm*—King & Schickli, PLLC

(57) ABSTRACT

Methods and apparatus cryptographically bind authentication schemes to verify that a secure authentication sequence was executed for access to sensitive applications/resources. Users execute two login sequences with a strong authentication framework. Upon completion of the first, the framework generates an unencrypted token from underlying data, later hashed into an authentication token. With a private key corresponding to the first sequence, the authentication token is encrypted and passed to the second sequence where it is encrypted again with a private key corresponding to the second sequence. Upon access attempts to the sensitive applications/resources, verification of execution of the two login sequences includes recovering the authentication token from its twice encrypted form and comparing it to a comparison token independently generated by the application/resource via the underlying data. An audit log associated with the application/resource stores the data, the recovered authentication token, etc., for purposes of later non-repudiation.

18 Claims, 2 Drawing Sheets

CRYPTOGRAPHIC BINDING OF AUTHENTICATION SCHEMES

FIELD OF THE INVENTION

Generally, the present invention relates to computing environments involving accessing security sensitive applications or resources, especially by way of various authentication schemes, e.g., smart card, password, fingerprint, DNA, retina scan, etc. Particularly, it relates to cryptographically binding the authentication schemes to verify that a secure authentication sequence has been executed for gaining access to the applications/resources. Features of the invention include authentication schemes, tokens, token form, encryption assets and techniques, and party interaction as well as computer program products, computing networks and computing devices, to name a few.

BACKGROUND OF THE INVENTION

Many authentication systems, such as Novell, Inc.'s Modular Authentication Service (NMAS), provide varying levels of strong authentication. NMAS, for instance, can authenticate users using biometrics (e.g., fingerprint, retina scan, etc.), tokens (one-time passwords, smart cards), and passwords. Security sensitive applications or resources, such as corporate financial information, personal and personnel information, military secrets, nuclear technology, banking activity, securities trading, health/patient records, etc., use these authentication services to prevent unauthorized users from gaining access. However, it presently exists that these applications/resources are unable to prove, after-the-fact, that access was indeed granted to proper users, after proper authentication, or that proper users were granted access when it is argued that other parties had improper access and it is the other parties that committed malicious acts, damage, or otherwise simply had access or exposure to sensitive information.

To this end, security-sensitive applications/resources have need to verify or prove that a particularly strong sequence of authentication methods was, in fact, executed prior to granting access to a particular party and that party only. In that many computing configurations already have strong authentication services, it is further desirable to leverage existing configurations by way of retrofit technology, thereby avoiding the costs of providing wholly new products. Taking advantage of existing frameworks, such as NMAS, is another feature that optimizes existing resources. Any improvements along such lines should further contemplate good engineering practices, such as relative inexpensiveness, stability, ease of implementation, high security, low complexity, flexibility, etc.

SUMMARY OF THE INVENTION

The foregoing and other problems become solved by applying the principles and teachings associated with the hereinafter-described cryptographic binding of authentication schemes. At a high level, methods and apparatus teach cryptographic binding to verify that a secure authentication sequence was indeed executed before granting of access to sensitive applications or resources.

In a representative embodiment, users execute two login sequences with a strong authentication framework. (Of course, more than two are possible along with increasing assurances of proper authentication.) Upon completion of the first, the framework generates an unencrypted token from data, later hashed into an authentication token. With a private key corresponding to the first sequence, the authentication token is encrypted and passed to the second sequence where it is encrypted again with a private key corresponding to the second sequence. Upon access attempts to the sensitive applications or resources, verification of execution of the two login sequences includes recovering the authentication token from its twice encrypted form and comparing it to a comparison token independently generated by the application or resource via the data underlying the unencrypted token. An audit log associated with the application or resources stores the data, the recovered authentication token, etc., for purposes of later non-repudiation.

In a computing system embodiment, the invention may be practiced with: a computing workstation; a strong authentication service and a sensitive application or resource all arranged as part of pluralities of physical or virtual computing devices, including executable instructions for undertaking the following. During use, the strong authentication service has a plurality of authentication schemes each with a login sequence for a user to login by from the workstation. Each login sequence also includes a private key and public key pair generated at the time of installation. The strong authentication service generates an authentication token from unencrypted data upon completion of a first of the login sequences. It passes the authentication token from the first to a second of the login sequences after the first login sequence encrypts the authentication token with its corresponding private key. The second sequence then encrypts again, but with the assistance of the private key corresponding to the second of the login sequences.

The sensitive application or resource connects to both the computing workstation for the user to gain access and to the strong authentication service. It acquires the twice encrypted authentication token and the underlying data used to generate the original authentication token. It recovers the authentication token in an unencrypted form by using retrieved public keys for the first and second sequences. Upon generating a comparison token from the underlying data, it compares the comparison token to the recovered authentication token to see if they are the same. To the extent they are, the application or resource has proof of the proper authentication schemes being executed. If not, it is likely that the user did not perform the required sequences, or an impostor is attempting to gain access. In either event, access is denied.

Audit logging of the many events, tokens, data, etc. are also contemplated should it be necessary to later prove that a specific user gained access to the application or resource. It undercuts a malicious users ability to argue that another party improperly used their credentials.

Computer program products are also disclosed. For instance, a product available as a download or on a computer readable medium has components to undertake some or all of the foregoing notions of the computing system environment. They are also available for installation on a user's workstation, a strong authentication service, such as Novell, Inc.'s NMAS, a sensitive application or resource, or elsewhere.

In still other embodiments, token form, encryption techniques, computing networks, and various party interaction is discussed, as are possible authentication schemes, e.g., smart card, password, fingerprint, DNA, retina scan, etc.

These and other embodiments of the present invention will be set forth in the description which follows, and in part will become apparent to those of ordinary skill in the art by reference to the following description of the invention and referenced drawings or by practice of the invention. The claims, however, indicate the particularities of the invention.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE ILLUSTRATED EMBODIMENTS

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical, arrangement, software and/or other changes may be made without departing from the scope of the present invention. In accordance with the present invention, methods and apparatus for cryptographic binding of authentication schemes are hereinafter described.

Figure 1:
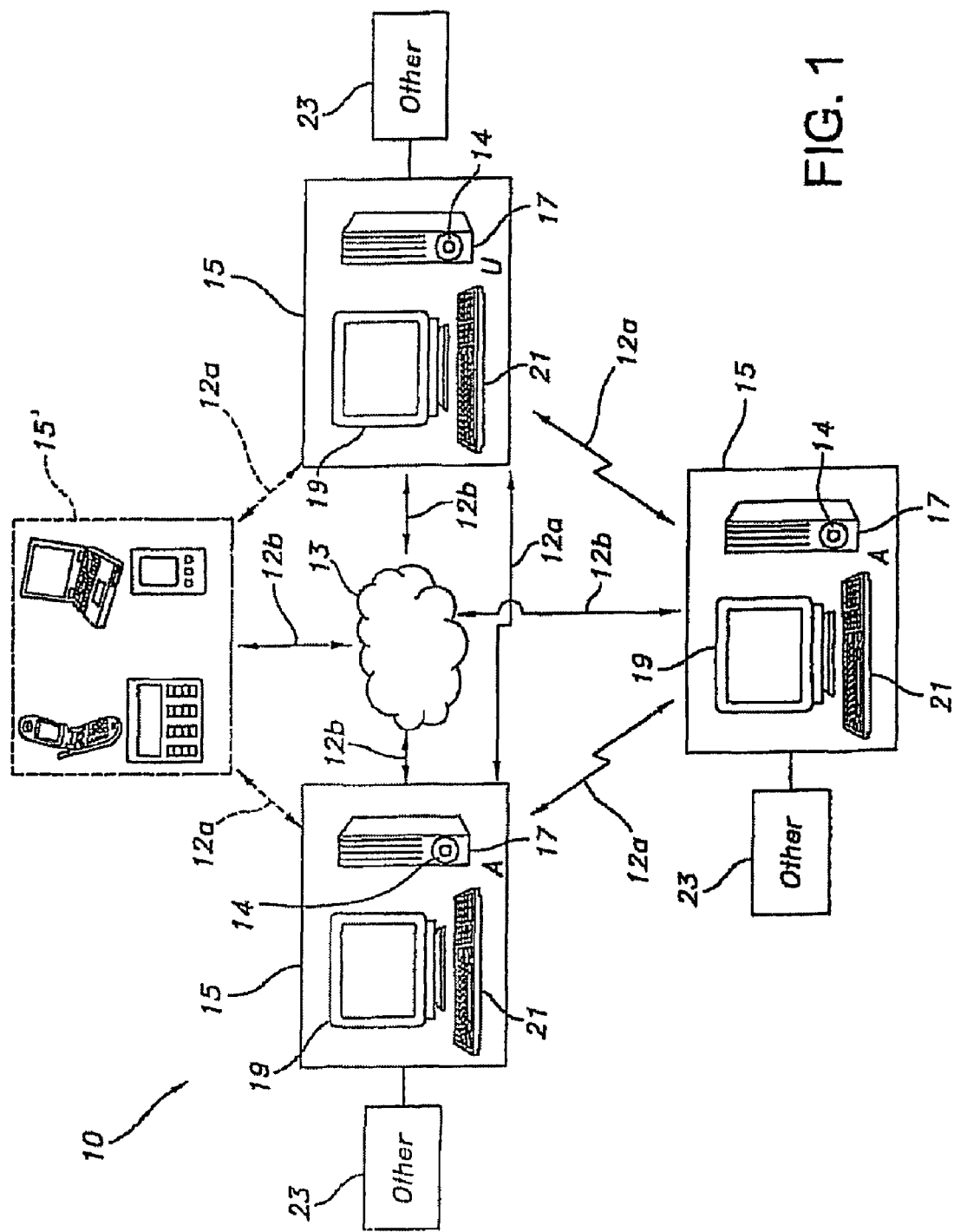
FIG. 1 is a diagrammatic view in accordance with the present invention of a representative computing environment for cryptographically binding authentication schemes.

With reference to FIG. 1, a representative computing environment 10 for practicing the invention includes one or more computing devices 15 or 15', per user workstations, strong authentication services, sensitive applications or resources, etc., arranged as individual or networked physical or virtual machines, including clients or hosts arranged with a variety of other networks and computing devices. In a traditional sense, an exemplary computing device typifies a server 17, such as a grid or blade server. Alternatively, it includes a general or special purpose computing device in the form of a conventional fixed or mobile computer 17 having an attendant monitor 19 and user interface 21. The computer internally includes a processing unit for a resident operating system, such as DOS, WINDOWS, MACINTOSH, VISTA, UNIX, and LINUX, to name a few, a memory, and a bus that couples various internal and external units, e.g., other 23, to one another. Representative other items 23 include, but are not limited to, PDA's, cameras, scanners, printers, microphones, joy sticks, game pads, satellite dishes, hand-held devices, consumer electronics, minicomputers, computer clusters, main frame computers, a message queue, a peer machine, a broadcast antenna, a web server, an AJAX client, a grid-computing node, a peer, a virtual machine, a web service endpoint, a cellular phone, or the like. The other items may also be stand alone computing devices 15' in the environment 10 or the computing device itself.

In either, storage devices are contemplated and may be remote or local. While the line is not well defined, local storage generally has a relatively quick access time and is used to store frequently accessed data, while remote storage has a much longer access time and is used to store data that is accessed less frequently. The capacity of remote storage is also typically an order of magnitude larger than the capacity of local storage. Regardless, storage is representatively provided for aspects of the invention contemplative of computer executable instructions, e.g., software, as part of computer program products on readable media, e.g., disk 14 for insertion in a drive of computer 17. Computer executable instructions may also be available as a download or reside in hardware, firmware or combinations in any or all of the depicted devices 15 or 15'.

When described in the context of computer program products, it is denoted that items thereof, such as modules, routines, programs, objects, components, data structures, etc., perform particular tasks or implement particular abstract data types within various structures of the computing system which cause a certain function or group of functions. In form, the computer product can be a download or any available media, such as RAM, ROM, EEPROM, CD-ROM, DVD, or other optical disk storage devices, magnetic disk storage devices, floppy disks, or any other medium which can be used to store the items thereof and which can be assessed in the environment.

In network, the computing devices communicate with one another via wired, wireless or combined connections 12 that are either direct 12a or indirect 12b. If direct, they typify connections within physical or network proximity (e.g., intranet). If indirect, they typify connections such as those found with the internet, satellites, radio transmissions, or the like, and are given nebulously as element 13. In this regard, other contemplated items include servers, routers, peer devices, modems, T1 lines, satellites, microwave relays or the like. The connections may also be local area networks (LAN) and/or wide area networks (WAN) that are presented by way of example and not limitation. The topology is also any of a variety, such as ring, star, bridged, cascaded, meshed, or other known or hereinafter invented arrangement.

Figure 2:
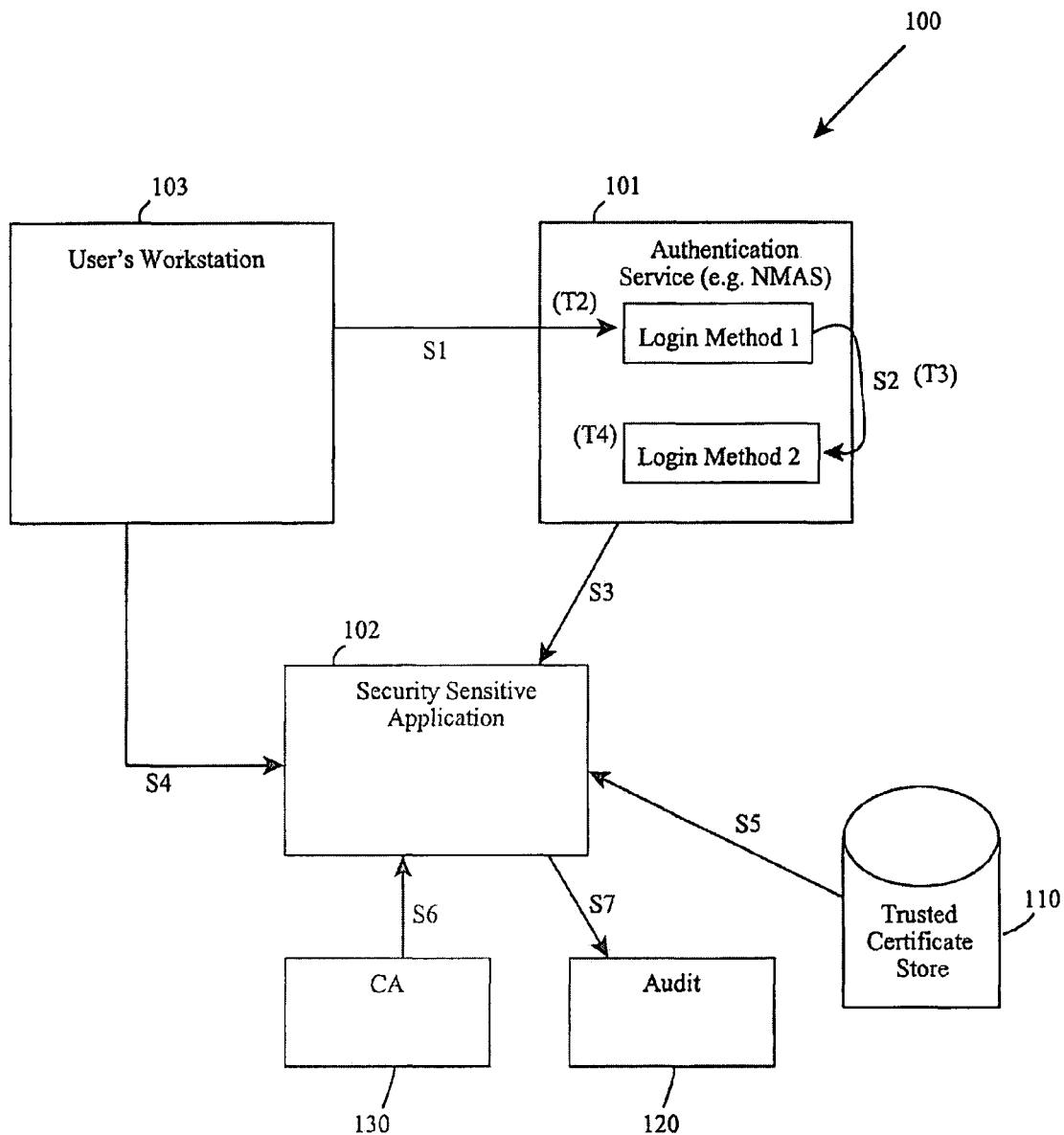
FIG. 2 is a diagrammatic view and flow chart in accordance with the present invention for undertaking cryptographic binding of authentication schemes.

With the foregoing representative computing environment as backdrop, FIG. 2 teaches methods and apparatus 100 for cryptographically binding authentication schemes (e.g. login methods 1, 2) to verify that a secure authentication sequence was executed (via a strong authentication framework or service 101) to gain access (e.g., from a user's workstation 103) to a sensitive application or resource 102.

At step S1, a user executes the login sequences for the authentication schemes of the strong authentication service. For example, NMAS may be outfitted with various schemes providing varying levels of strong authentication. In one instance, the authentication schemes relate to user-fixed characteristics such as biometrics in the form of fingerprints, retina scans, DNA, etc. In another, they relate to electronic structures, such as smart cards, microchips, magnetic stripes, etc. In still another, they are user-created, such as passwords, secrets, usernames, PINS, or other credentials. Regardless of form, they are referred to generically herein as Login Methods 1, 2, (although any number could be used) and users log-in from their workstation, including navigation with apparatus such as card readers, retina or fingerprint scanners, password forms, keypads, etc., as is typical. (In certain embodiments, the workstation may be simply a computing device in the form of a card reader, retina or fingerprint scanner, password form, keypad, etc., such as 15' in FIG. 1 without the more traditional form of element 15 in FIG. 1.)

Also, at their time of installation with the service, the login methods are outfitted with a security certificate and a corresponding public and private key pair dedicated to their respective methods. The private key is secured in a Hardware Security Module (HSM) or otherwise cryptographically protected in some manner for the service, such that the server module (not shown) for Login Method 1 is the only module that can access Login Method 1's private key. Similarly, the server module for Login Method 2 is the only module that can access Login Method 2's private key, and so on.

Upon successful execution of the first Login Method 1, the strong authentication service generates an unencrypted token, that later becomes encrypted per the authentication methods, and passed to the sensitive application or resource for verification. As skilled artisans will understand, a secure authorization token can be created in a variety of ways, including taking some set of known data (a user identifier (UID) and random nonce, for instance) and encrypting that data with a private key, twice, per each of the required Login Methods of authentication. The security-sensitive application then verifies the token by decrypting the known data and using standard Public Key Infrastructure (PKI) methods to verify the validity of the keys used.

In more detail, the token is preferably generated in the same way regardless of what actual authentication Login Method is used. For example, when the token is initially generated, it might look like this 24-byte, unencrypted token: UUUUUUUUNNNNNNNNNNNNNNNN, where U=UID and N=Random Nonce.

As is seen, the first eight bytes (the first eight U's) are the UID, while the last 16 bytes (the next 16 N's) are the random nonce. (The purpose of the nonce is to make sure that each instance of the authorization token is different. This helps resist a replay attack, where an attacker might try to reuse a token from a previous authentication session.) Hereafter, the unencrypted token is referred to as T1, such that:

T1=UUUUUUUUNNNNNNNNNNNNNNNN.

When the first authentication method is successful, the strong authentication framework generates T1. The strong authentication framework then computes a hash of T1 to arrive at the authentication token, T2. For the sake of example, a representative embodiment corresponds to a SHA1 hash, such that T2=SHA1(T1).

Upon the successful authentication of Login Method 1 (LM1), the Login Method retrieves T2 from the strong authentication service and generates token T3 by encrypting T2 with its private key. In turn, T3=LM1Encrypt(T2, LM1PrivateKey). At such time, token T3 is returned to the strong authentication framework, at step S2, and passed to the second or next authentication scheme, Login Method 2 (LM2).

After the second authentication scheme (LM2, in this instance) successfully authenticates the user, it retrieves or receives token T3 from the strong authentication service. LM2 then generates a fourth token T4 by encrypting the already-encrypted token T3 with its dedicated private key, i.e., T4=LM1Encrypt(T3, LM2PrivateKey). In other words, each of the authentication schemes use their corresponding private key to encrypt a presented token. In that the first scheme encrypts and then the second, the original token becomes twice encrypted.

T4 is then the final token, and is used to prove that the user successfully executed both the first and second login sequences of the required authentication schemes. To the extent a user, who has logged in with both schemes, tries to access a Security Sensitive Application (SSA) 102, the SSA can verify that the user followed the proper authentication protocol, as will be seen. Also, skilled artisans will appreciate that the user can login and have tokens generated variously. In a series approach, the user logs in to the first authentication scheme, with the appropriate generation of tokens (T1-T3) and then logs in to the second authentication scheme with the appropriate generation of the fourth and final token T4 thereafter. In a parallel approach, the user logs in to both the first and second authentication schemes, before the generation of any tokens, and only thereafter do the Login Methods and the strong authentication service generate the entirety of the tokens (T1-T4). In a hybrid approach, certain of the tokens may be generated before and after the second login method is executed by the user. Of course, still other embodiments are possible as skilled artisans will be able to imagine.

Regardless of approach, the SSA retrieves (is passed) the token T4, and the underlying data used in creating the authentication token, i.e., the UID, and random nonce (RN), from the secure authentication framework at step S3. Preferably, this occurs over a secure, authenticated connection. At step S4, as the user attempts to access the security sensitive application, the SSA checks to see if the user has executed the required login sequence. At a high level, this occurs by the SSA retrieving public-key certificates for both the Login Methods 1, 2 at step S5 from its trusted certificate store 110. (The certificates must have been placed in the store prior to effectuation of the authentication schemes by the user.) Then, the SSA uses both the keys to decrypt the token T4 in a manner opposite in which it was encrypted. By way of the underlying data, i.e., the UID and RN, the SSA independently creates an authentication token T2', of sorts, for comparison to the original authentication token T2. If they match, then the SSA has proof that the user performed the required authentication sequence.

In more detail, the SSA 102 was configured at some time to require a sequence of Login Methods 1 and 2, corresponding to the Login Methods 1 and 2 effectuated by the user, via the strong authentication service. At install time, the public-key certificates for the Login Methods were stored in a secure data store (i.e., 110) that belongs to the SSA. In form, each public-key certificate is a signed collection of data that contains the public key for its corresponding login method.

To actual recover the authentication token, the SSA retrieves T3 by decrypting T4 with the public key from LM2's certificate, i.e., T3=LM1Decrypt(T4, LM2PublicKey). Next, the SSA retrieves the original authentication token T2 by decrypting T3 with the public key from LM1's certificate, i.e., T2=LM1Decrypt(T3, LM1PublicKey). In turn, the SSA 102 computes its own version of T2 (T2', the comparison token) to see if the tokens are the same. To do this, the SSA performs the acts that the strong authentication service performed, such as concatenating the UID and nonce (i.e., T1), and performing a SHA-1 hash thereon, i.e., T2'=SHA1(UID+RN). If T2' matches T2, then the SSA has proof that the user identified by the UID executed both the Login Methods 1 and 2, and in that order. The proof is based on the following assumptions:

1a) the private key for each Login Method of the many authentication schemes is secure; 1b) each Login Method can access its own private key, but no others; and 1c) no other entity may access a Login Method's private key;

2a) each Login Method will only encrypt a token with its private key upon successful authentication of a user; and 2b) a Login Method cannot be made to encrypt a token for any other reason; and 3) the unencrypted token (T1) contains a modicum of data, but preferably more, to positively identify the user, which is why a UID, for example, is contained in the token. In turn, this binds the token to the user, and no others, and prevents an attacker from intercepting a token from another user and using it for himself.

On the other hand, if T2' does not match T2, then it likely means that either the user did not perform the required authentication sequences, e.g., LM1 and LM2, or the UID in the token does not match the UID of the user attempting access. In either event, the SSA denies access to the user.

At step S6, the SSA performs a standard PKI validation of the certificates belonging to the Login Methods, as stored with the certificate authority (CA) 130. If either of the certificates of the methods has been revoked, it could mean that one or both of the methods' private keys have been compromised, and the user will be denied access to the SSA.

Finally, at step S7, the final token T4 and the underlying data used to originally create it, e.g., the UID and the random nonce, RN, are stored in an audit log 120 that belongs to the SSA for the purposes of non-repudiation. Should it be necessary to later prove that the user accessed the SSA, this information could be used in conjunction with the public-key certificates for the login methods to prove that the user performed both LM1 and 2 before accessing the SSA. Also, this would make it difficult for a malicious user to argue that someone else stole their authentication credentials (password) and used it to access the SSA.

In alternate embodiments of the invention, the format of the token could be anything that is agreed upon by the strong authentication framework and the SSA. For example, to add even more security, the token could be modified to include an expiration time. Representatively, a token formatted in this manner might look like this: UUU-UUUUUNNNNNNNNNNNNNNNNEEEEEEEE, where U=UID, N=Random Nonce and E=Expiration Time. In this situation, the SSA would also verify that the token has not expired by checking to see if the current time is later than the time specified by E. If the token is expired, then the user would be forced to login in again before accessing the SSA.

In other alternate embodiments, it is possible that the final token T4 is passed back to the user's workstation, such that when the user tries to gain access to the SSA, it brings along the token T4 for the SSA to verify. In this manner, the token T4 is not directly passed to the SSA from the strong authentication service, but arrives from the workstation.

In any embodiment, certain advantages and benefits over the prior art should be readily apparent. For example, methods and apparatus teach an arrangement of computing devices whereby security-sensitive applications/resources verify or prove that a particularly strong sequence of authentication methods was, in fact, executed prior to granting access to a particular party and that party only. In others, existing configurations, such as NMAS, are leveraged by way of retrofit technology, thereby avoiding the costs associated with providing wholly new products. Still other advantages exist in the form of authentication schemes, tokens, token form, encryption assets and techniques, and party interaction as well as computer program products, computing networks and computing devices, to name a few.

One of ordinary skill in the art will recognize that additional embodiments are also possible without departing from the teachings of the present invention. This detailed description, and particularly the specific details of the exemplary embodiments disclosed herein, is given primarily for clarity of understanding, and no unnecessary limitations are to be implied, for modifications will become evident to those skilled in the art upon reading this disclosure and may be made without departing from the spirit or scope of the invention. Relatively apparent modifications, of course, include combining the various features of one or more figures with the features of one or more of other figures.

The invention claimed is:

1. In a computing system environment having pluralities of computing devices, a method of cryptographically binding authentication schemes to verify that a secure authentication sequence was executed at a first computing device to gain access to a sensitive application or resource on a second computing device, comprising:

executing at the first computing device two login sequences for the authentication schemes with a strong authentication framework;

upon completion of a first sequence of the two login sequences at the first computing device, generating an authentication token;

by the first sequence of the two login sequences, encrypting at the first computing device the authentication token using a private key corresponding to the first sequence;

upon completion of a second sequence of the two login sequences at the first computing device, encrypting the encrypted authentication token with a private key corresponding to the second sequence; and upon a user attempting to access the sensitive application or resource on the second computing device, verifying the secure authentication sequence at the first computing device by twice decrypting the encrypted said encrypted authentication token to recover the authentication token.

2. The method of claim 1, further including, by the sensitive application or resource, computing a comparison token for comparing to the authentication token.

3. The method of claim 2, wherein the authentication token is generated from a UID and a nonce, further including passing the UID and the nonce to the sensitive application or resource for the computing the comparison token.

4. The method of claim 1, further including installing the two login sequences, including generating a public key and private key pair for each sequence of the two login sequences.

5. The method of claim 4, wherein the sensitive application or resource retrieves the public key for the each sequence in order to perform the twice decrypting.

6. The method of claim 1, further including generating an unencrypted token upon successful completion of the first sequence of the two login sequences.

7. The method of claim 6, wherein the generating the authentication token further includes hashing the unencrypted token.

8. The method of claim 6, wherein the generating the unencrypted token further includes generating a UID and a nonce.

9. The method of claim 1, further including agreeing upon a format of the authentication token by the strong authentication framework and the sensitive application or resource.

10. The method of claim 1, wherein the generating the authentication token further includes setting an expiration time.

11. The method of claim 1, further including storing at the second computing device the recovered authentication token in an audit log corresponding to the sensitive application or resource for purposes of non-repudiation at a future time.

12. In a computing system environment having pluralities of computing devices, a method of cryptographically binding authentication schemes to verify that a secure authentication sequence was executed at a first computing device to gain access to a sensitive application or resource at a second computing device, comprising:

installing two login sequences at the first computing device for the authentication schemes, including generating a public key and private key pair for each sequence of the two login sequences;

upon completion of a first sequence of the two login sequences at the first computing device, generating an authentication token;

encrypting the authentication token using the private key corresponding to the first sequence;

upon completion of a second sequence of the two login sequences at the first computing device, encrypting the encrypted authentication token with a private key corresponding to the second sequence;

upon a user attempting to access the sensitive application or resource at the second computing device, verifying the secure authentication sequence at the first computing device by twice decrypting the encrypted said encrypted authentication token to recover the authentication token, including retrieving the public key for the each sequence in order to perform the twice decrypting; and storing at the second computing device the recovered authentication token in an audit log corresponding to the sensitive application or resource for purposes of later non-repudiation.

13. The method of claim 12, further including, by the sensitive application or resource, computing a comparison token for comparing to the authentication token.

14. The method of claim 13, wherein the authentication token is generated from a UID and a nonce, further including passing the UID and the nonce to the sensitive application or resource for the computing the comparison token.

15. The method of claim 12, further including generating an unencrypted token upon successful completion of the first sequence of the two login sequences.

16. The method of claim 15, wherein the generating the authentication token further includes hashing the unencrypted token.

17. The method of claim 12, further including agreeing upon a format of the authentication token by the strong authentication framework and the sensitive application or resource.

18. In a computing system environment having pluralities of computing devices, a method of cryptographically binding authentication schemes to verify that a secure authentication sequence was executed at a first computing device to gain access to a sensitive application or resource at a second computing device, comprising:

installing two login sequences at the first computing device, including generating a public key and private key pair for each sequence of the two login sequences;

executing at the first computing device the two login sequences with a strong authentication framework;

upon completion of a first sequence of the two login sequences, generating an unencrypted token;

by the strong authentication framework, hashing the unencrypted token to achieve an authentication token;

by the first sequence of the two login sequences at the first computing device, encrypting the authentication token using the private key for the first sequence;

forwarding the encrypted authentication token to a second sequence of the two login sequences at the first computing device;

upon completion of a second sequence of the two login sequences at the first computing device, encrypting the forwarded encrypted authentication token;

upon a user attempting to access the sensitive application or resource at the second computing device, verifying the secure authentication sequence at the first computing device by the sensitive application or resource including computing a comparison token for comparing to a version of the authentication token recovered from the encrypted said forwarded encrypted authentication token; and making the verifying available for later auditing.

* * * * *